United States Patent Office 3,026,351
Patented Mar. 20, 1962

3,026,351
IODO-BENZOIC ACID COMPOUNDS
Philip E. Wiegert, St. Louis, Mo., assignor to Mallinckrodt Chemical Works, St. Louis, Mo., a corporation of Missouri
No Drawing. Filed Sept. 19, 1958, Ser. No. 761,956
5 Claims. (Cl. 260—519)

This invention relates to organic compounds and more particularly to certain novel benzoic acid derivatives.

Briefly the present invention is directed to certain novel compounds having the formula:

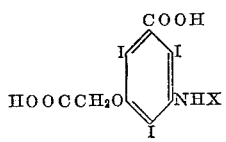

where X is hydrogen or a lower acyl radical, and non-toxic salts and esters thereof, and to methods of preparing them. The preferred compounds are those wherein X is hydrogen or a lower carboxylic acyl radical, and the sodium and N-methylglucamine salts thereof.

Among the objects of the present invention may be noted the provision of new benzoic acid derivatives; the provision of new halogenated compounds; the provision of compounds of the type indicated which are useful for the preparation of roentgenographic contrast media, and the provision of methods of preparing these compounds. Other objects and features will be in part apparent and in part pointed out hereinafter.

The invention accordingly comprises the products and methods hereinafter described, the scope of the invention being indicated in the following claims.

The present invention is directed to the novel benzoic acid derivatives represented by the formula:

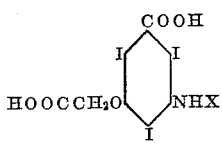

where X is hydrogen or a lower acyl radical, and non-toxic salts and esters thereof.

In the preparation of the novel compounds of the invention it is convenient to use commercially available 3,5-dinitrobenzoic acid as the starting material. This compound is conveniently converted to 3-hydroxy-5-nitro-benzoic acid by known processes, such as reduction of one nitro group with a selective reducing agent, such as sodium hydrosulfide or ammonium sulfide, and diazotization of the resulting amine, followed by hydrolysis of the diazo compound.

In the preparation of the novel compounds of the invention, the carboxyl group of the 3-hydroxy-5-nitrobenzoic acid is advantageously esterified to forestall its reacting with the haloacetic ester used in the subsequent etherification step. The phenolic hydroxyl may then be etherified by causing a solution of a salt, formed by neutralizing the phenolic hydroxyl group of the esterified 3-hydroxy-5-nitrobenzoic acid, to react with an appropriate haloacetic ester, such as ethyl bromoacetate, to form the diester of 3-carboxy-methoxy-5-nitrobenzoic acid. The diester is then conveniently hydrolyzed, after which the nitro group is reduced by an appropriate process, such as catalytic hydrogenation, to form the corresponding amino compound. Iodine may then be conveniently introduced by means of an iodinating agent such as iodine monochloride, and the resulting triiodo compound may then be acylated by means of an acid anhydride or other appropriate acylating agent such as an acyl halide, to yield the corresponding 3-alkanamido-5-carboxymethoxy-2,4,6-triiodobenzoic acid. Salts and esters thereof may be prepared by means well known to those skilled in the art.

Although the various synthetic steps are preferably carried out in the order outlined above, possible variations will occur to those skilled in the art, although these may reduce the yield or otherwise adversely affect the over-all efficiency of the process.

The 3-alkanamido-5-carboxymethoxy-2,4,6-triiodobenzoic acids of the present invention are useful for the preparation of roentgenographic contrast media. For example, certain salts of these acids with non-toxic cations such as sodium and N-methylglucamine, are highly soluble in water, and sterile aqueous solutions of such salts are of low toxicity and contain a high concentration of organically bound and substantially physiologically inert iodine.

Such solutions are useful for vasography. These compounds are also useful for the visualization of structures of the excretory system. Solutions of these acids or their salts in pharmaceutically acceptable solvents other than water are also useful for special purposes.

Dispersions of water insoluble derivatives of the acids, such as their esters, are also useful, as for example in visualizing hollow structures and cavities having external orifices through which the contrast preparation can be introduced in preparation for the examination and removed after the examination is completed.

The compounds are also useful for the preparation of other types of contrast media, such as non-aqueous dispersions.

As is evident from the preceding description of the synthetic processes used in preparing the 3-alkanamido-5-carboxymethoxy-2,4,6-triiodobenzoic acids of the invention, the intermediate compound, 3-amino-5-carboxymethoxy-2,4,6-triiodobenzoic acid, is valuable for the preparation of these 3-alkanamido-5-carboxymethoxy-2,4,6-triiodobenzoic acids and other useful compounds.

The following examples illustrate the invention:

EXAMPLE 1

*Diethyl Ester of 3-Carboxymethoxy-5-Nitrobenzoic Acid*

Ethyl 3-hydroxy-5-nitrobenzoate (86 g.) was added to a solution of sodium (16.3 g.) in anhydrous ethanol (1000 ml.). Ethyl bromoacetate (83.5 g.) was added dropwise and the solution was refluxed for 12 hours, after which the precipitate was filtered off and discarded. The filtrate was neutralized, treated with charcoal and filtered, and most of the alcohol was evaporated. 2000 ml. of water was added and the resulting precipitate was heated in 500 ml. of water until it melted. The mixture was then made strongly alkaline with sodium hydroxide solution and cooled rapidly to dissolve any remaining phenolic starting material with minimum hydrolysis of the product. The crude diethyl ester of 3-carboxymethoxy-5-nitrobenzoic acid was filtered off and recrystallized from anhydrous ethanol after a charcoal treatment. Yield, 48.5 g. (40%); M.P., 66–67° C.

EXAMPLE 2

*3-Carboxymethoxy-5-Nitrobenzoic Acid*

A mixture of the diethyl ester of 3-carboxymethoxy-5-nitrobenzoic acid (48.5 g.), methanol (275 ml.), potassium hydroxide (21.3 g.), and enough water to effect solution was refluxed for 4 hours. The mixture was cooled, acidified, and the 3-carboxymethoxy-5-nitrobenzoic acid filtered off. Yield, 33 g. (84%); M.P., 231–232° C.; N.E. 120 (theory, 120.6).

EXAMPLE 3

3-Amino-5-Carboxymethoxybenzoic Acid 3-carboxymethoxy-5-nitrobenzoic acid (48.2 g.) was slurried in 150 ml. of water, the acid was neutralized with sodium hydroxide solution, and 5% palladium-on-charcoal catalyst (5 g.) was added. Hydrogen was introduced under pressure and after the theoretical quantity had been absorbed the catalyst was filtered off and the filtrate was acidified to precipitate 3-amino-5-carboxymethoxybenzoic acid. Yield, 21 g. (50%); N.E., 105.5 (theory, 105.6).

EXAMPLE 4

3-Amino-5-Carboxymethoxy 2,4,6-Triiodobenzoic Acid 3-amino-5-carboxymethoxybenzoic acid (62 g.) was slurried in 300 ml. of water and 50 ml. of concentrated hydrochloric acid. Iodine monochloride (153 g. of 95% ICl in 150 ml. of concentrated hydrochloric acid) was added to the stirred slurry. The reaction mixture was heated for 5 hours at 75° C. and allowed to stand two days. The incompletely iodinated product was filtered off and slurried in diluted hydrochloric acid (300 ml. of water and 40 ml. of concentrated acid) and additional iodine monochloride (100 g. of 95% ICl in 100 ml. of concentrated hydrochloric acid) was added. The solution was heated on the steam bath for 1½ hours, after which the excess iodine monochloride was reduced with sodium bisulfite. The crude 3-amino-5-carboxymethoxy-2,4,6-triiodobenzoic acid was filtered off and washed with water. Yield, 69.5 g. (40%).

EXAMPLE 5

3-Acetamido-5-Carboxymethoxy-2,4,6-Triiodobenzoic Acid

A mixture of crude 3-amino-5-carboxymethoxy-2,4,6-triiodobenzoic acid (62 g.), acetic anhydride (75 ml.), and sulfuric acid (1 ml.) was heated one hour on the steam bath with occasional swirling. The slurry was cooled and the solid filtered off and reslurried in 200 ml. of water and sufficient sodium hydroxide to dissolve it. The solution was treated 3 times with charcoal and the white 3-acetamido-5-carboxymethoxy-2,4,6-triiodobenzoic acid precipitated by the addition of concentrated hydrochloric acid. Yield, 32.5 g. (49%), N.E. 318 (theory, 315.5). The product did not melt below 300° C.

EXAMPLE 6

Disodium Salt of 3-Acetamido-5-Carboxymethoxy-2,4,6-Triiodobenzoic Acid

A slurry of 3-acetamido-5-carboxymethoxy-2,4,6-triiodobenzoic acid was dissolved by the addition of sufficient sodium hydroxide to make a neutral solution and the solution was evaporated to dryness to yield a residue of the disodium salt of 3-acetamido-5-carboxymethoxy-2,4,6-triiodobenzoic acid. The solubility of this salt at 25° C. is 109 g./100 ml. of solution (188 g./100 ml. of water).

A solution of the disodium salt was prepared by neutralizing a slurry of 3-acetamido-5-carboxymethoxy-2,4,6-triiodobenzoic acid (25 g.) with sodium hydroxide solution. The solution was diluted to 50 ml. filtered and sterilized at 15 p.s.i. for 20 minutes. The resulting solution contained 53% (w./v.) of the disodium salt of 3-acetamido-5-carboxymethoxy-2,4,6 - triiodobenzoic acid. Upon injection of this solution intravenously in albino mice at varying dosage levels the acute intravenous $LD_{50}$ of this compound was found to be approximately 10,800 mg./kg.

Other 3-lower alkanamido-5-carboxymethoxy-2,4,6-triiodobenzoic acids, such as 3-formamido-5-carboxymethoxy-2,4,6-triiodobenzoic acid, 3-propionamido-5-carboxymethoxy-2,4,6-triiodobenzoic acid, and 3-butyramido-5-carboxymethoxy-2,4,6-triiodobenzoic acid may be prepared by treating 3-amino-5-carboxymethoxy-2,4,6-triiodobenzoic acid with appropriate acylating agents by processes generally similar to that described above.

In view of the above, it will be seen that the several objects of the invention are achieved and other advantageous results obtained.

As various changes could be made in the above products and methods without departing from the scope of the invention, it is intended that all matter contained in the above description shall be interpreted as illustrative and not in a limiting sense.

I claim:

1. A compound of the formula:

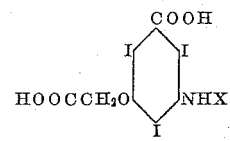

where X is selected from the group consisting of hydrogen and lower carboxylic acyl radicals, and the sodium and N-methylglucamine salts thereof.

2. 3-amino-5-carboxymethoxy-2,4,6-triiodobenzoic acid.

3. A 3-lower alkanamido-5-carboxymethoxy-2,4,6-triiodobenzoic acid.

4. 3-acetamido-5-carboxymethoxy-2,4,6 - triiodobenzoic acid.

5. The sodium salt of 3-acetamido-5-carboxymethoxy-2,4,6-triiodobenzoic acid.

References Cited in the file of this patent

UNITED STATES PATENTS

| | | |
|---|---|---|
| 2,611,786 | Wallingfor | Sept. 23, 1952 |
| 2,796,432 | Redel et al. | June 18, 1957 |
| 2,813,118 | Galler | Nov. 12, 1957 |
| 2,820,814 | Ginsberg | Jan. 21, 1958 |

OTHER REFERENCES

Wagner et al.: Synthetic Organic Chemistry, pp. 416, 417–654–7, 98, 99, 566, 567 and 568 (1953).